United States Patent
Colombo

(10) Patent No.: US 6,814,481 B2
(45) Date of Patent: Nov. 9, 2004

(54) SCREW EXTRUDER WITH IMPROVED MIXING PINS

(75) Inventor: Ubaldoo Colombo, Busto Arsizio (IT)

(73) Assignee: Colmec S.p.A., Vanzahelloô (IT)

( * ) Notice: Subject to any disclaimer, the term of this patent is extended or adjusted under 35 U.S.C. 154(b) by 27 days.

(21) Appl. No.: 10/399,111

(22) PCT Filed: Feb. 11, 2002

(86) PCT No.: PCT/EP02/01417
§ 371 (c)(1),
(2), (4) Date: Apr. 14, 2003

(87) PCT Pub. No.: WO02/068174
PCT Pub. Date: Sep. 6, 2002

(65) Prior Publication Data
US 2004/0115297 A1 Jun. 17, 2004

(30) Foreign Application Priority Data
Feb. 14, 2001 (EP) .............................. 01830096

(51) Int. Cl.[7] .............................................. A21C 1/06
(52) U.S. Cl. .................... 366/80; 366/307; 366/312; 425/208
(58) Field of Search ................ 366/80, 307, 312; 425/208

(56) References Cited

U.S. PATENT DOCUMENTS

| | | | | |
|---|---|---|---|---|
| 1,184,016 A | * | 5/1916 | Price ............................ | 366/80 |
| 3,480,997 A | | 12/1969 | List ............................. | 425/144 |
| 3,482,822 A | * | 12/1969 | Porter et al. ................ | 366/181.4 |
| 3,675,902 A | * | 7/1972 | Marshall ..................... | 366/307 |
| 5,324,108 A | | 6/1994 | Baumgarten .................. | 366/80 |
| 5,480,227 A | | 1/1996 | Baumgarten .................. | 366/80 |

FOREIGN PATENT DOCUMENTS

| | | |
|---|---|---|
| DE | 40 10 540 | 11/1991 |
| JP | 11-77667 | * 3/1999 |

OTHER PUBLICATIONS

Patent Abstracts of Japan, vol. 1999, No. 08, Jun. 30, 1999 & JP 11 077667 A (Bridgestone Cycle Co), Mar. 23, 1999 abstract.

* cited by examiner

Primary Examiner—Tony G. Soohoo
(74) Attorney, Agent, or Firm—Young & Thompson

(57) ABSTRACT

An extruder, in particular for elastomer material, is described, the extruder being of the type comprising an extruder body provided with a cylindrical chamber inside which an extrusion screw is rotatably inserted, and a plurality of mixing pin members inserted in the casing of the cylindrical chamber and projecting inside the the chamber, wherein each pin member is arranged tangential to the core of the screw, opposite interruptions in the thread of the screw and passes through the whole of the chamber, engaging in both the opposite walls of the casing.

9 Claims, 2 Drawing Sheets

SCREW EXTRUDER WITH IMPROVED MIXING PINS

The present invention relates to an extruder provided with mixing pins.

As is known, screw extruders are generally composed of an extruder body with a cylindrical chamber containing, longitudinally, a helical screw which, when rotated, pushes, mixes and compresses the extrusion material towards an extrusion head on which a die is mounted.

According to the prior art it is also envisaged, in certain cases, that the cylindrical chamber contains mixing pins or rods. As can be seen from FIGS. 1A and 1B, which show an extrusion cylinder according to the prior art, the pins are normally arranged at regular intervals in the longitudinal direction and inserted radially in the casing of the extruder body.

In order to prevent interference during operation, the pins are fit in the casing walls, opposite interruptions in the thread of the extrusion screw, and also project inwardly the cylindrical chamber by a distance which is undoubtedly less than the transverse dimension of the gap between the core of the screw and the internal surface of the said chamber.

The main functions of the pins is that of creating an obstacle to the feeding movement of the extrusion material, which is thus disturbed and mixed more thoroughly, and of exchanging heat with extrusion material.

However, at least two types of problem are associated with this configuration.

A first problem is linked with the impossibility of correctly regulating the temperature of these pins.

U.S. Pat. No. 5,324,108 discloses a pin cylinder extruder wherein some pins are provided tangentially in the chamber. Such pins have an internal dead hole where thermal fluid is made to circulate back and fort. Such a kind of circulation path for the thermal fluid is not efficient and requires that the internal diameter of the pins be sufficiently large to accomodate an exit tube.

Moreover, in the event of one or more of the rods breaking, the fragments which break off end up inside the cylindrical chamber, contaminating the extrusion material and, in the worst instance, damaging the extrusion screw or the actual cylindrical chamber.

U.S. Pat. No. 5,480,227 discloses a screw extruder provided with some diagonally inclined pins. The wall of the cylinder receiving the screw has an anular recess. Pins are located very close to a bead of the screw and partially embedded in said cylinder wall. In this way, the extruded material may come into contact with a small portion of the lateral surface of the pins, resulting in a poor thermal exchange. Moreover, extruded material is chennelled between the pins but not actually mixed.

The object of the present invention is to overcome the problems encountered in the prior art by providing a new and original design of extruder in which the temperature of the pins can be easily controlled even with small diameters, the extrusion material may be intimately mixed and thermally regulated by the pins and it is possible to prevent damage resulting from possible breakage of these pins.

These objects are achieved by means of a screw extruder as described in claim 1.

Further characteristic features and advantages of the device according to the invention will emerge, however, more clearly from the following detailed description provided by way of example and illustrated in the accompanying drawings, in which.

Figure 1A:
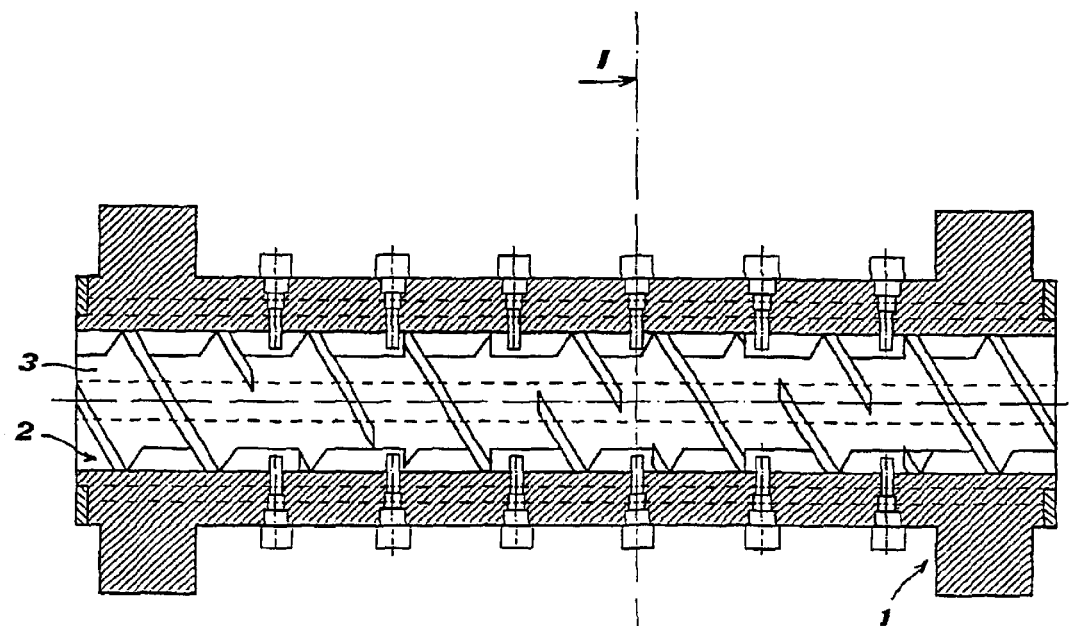
FIG. 1A is a longitudinally sectioned view through an extruder body according to the prior art.
Figure 1B:
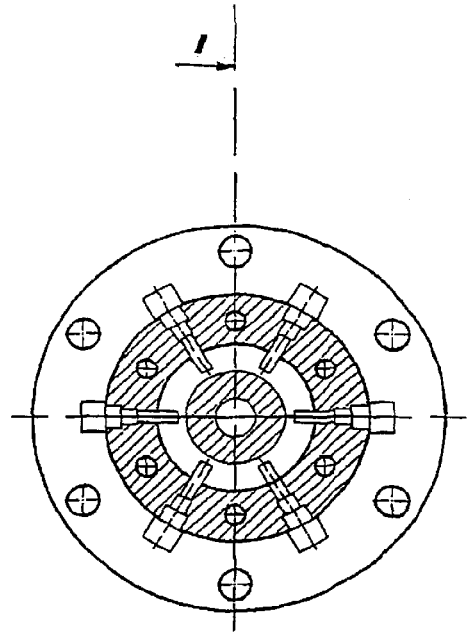
FIG. 1B is a cross-sectional view taken along the line I-I of FIG. 1A.

An extruder comprises, in a manner known per se, an extruder body 1 containing a cylindrical chamber 2 which longitudinally houses an extrusion screw 3.

The extrusion screw 3 is composed of a core N and a thread F which is spirally wound around the core N with a constant or variable pitch depending on the circumstances.

Rotation of the screw, which is obtained by means of known actuating means (not shown), causes feeding and compression of an extrusion material (in particular rubber, elastomer material or the like) introduced into the cylindrical chamber via a suitable loading opening (not shown).

According to the invention, mixing pin members 4 which pass through the whole of the thickness of the facing walls of the extruder body 1 and the cylindrical chamber 2 are provided. The pin members 4 are inserted and fixed inside suitable insertion holes in the extruder body so as to be tangential, and very close, to the core N of the extrusion screw 3.

Each pin member is composed of a hollow rod 4a which has, fixed to its ends, locking bushes 4b (for example engaged with the respective rod by means of a thread) by means of which the pin members are locked tightly on the extruder body.

At the point where the chamber 2 is passed through by one of the rods 4, the thread F has an interruption Fi.

Figure 2:
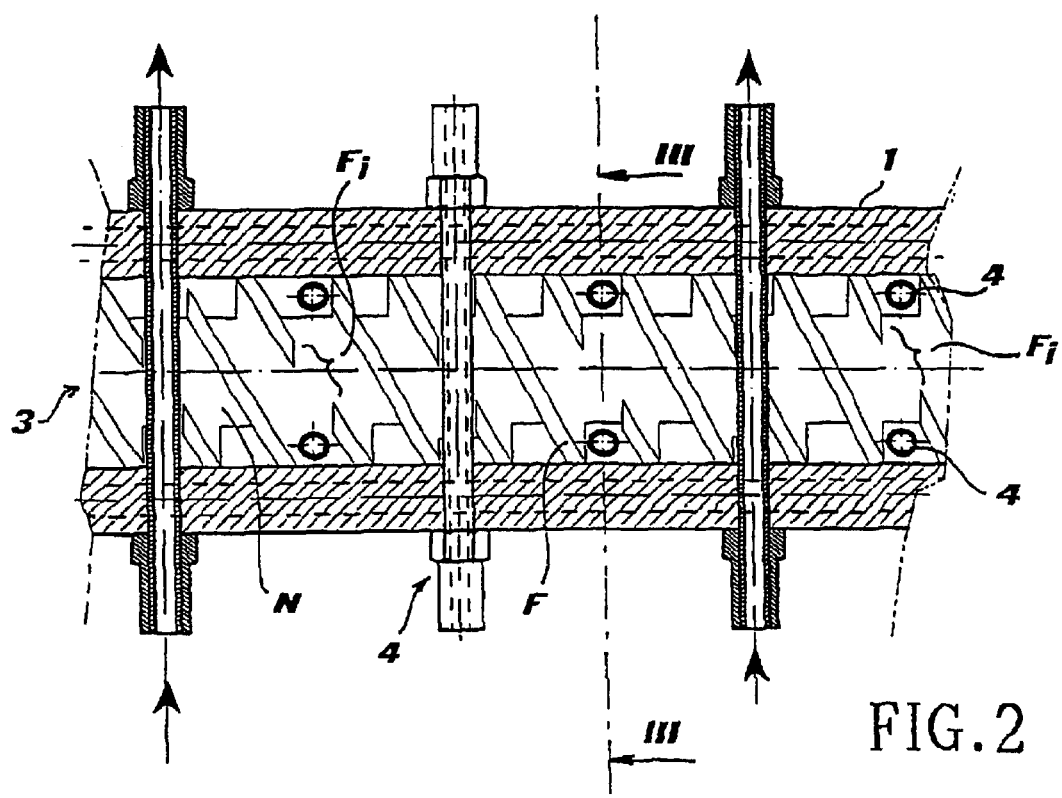
FIG. 2 is a partial longitudinal section through an extruder body according to the invention.

Preferably, the rods are arranged in pairs on either side of the core N. Moreover, the pairs of rods are distributed longitudinally, alternating at 90° with respect to each other (FIG. 2).

The rods 4a are tubular, namely they have at least one internal flow channel through which a heat-regulating liquid (for example oil or hot water or a cooling fluid, depending on the circumstances) can be circulated.

Figure 3:
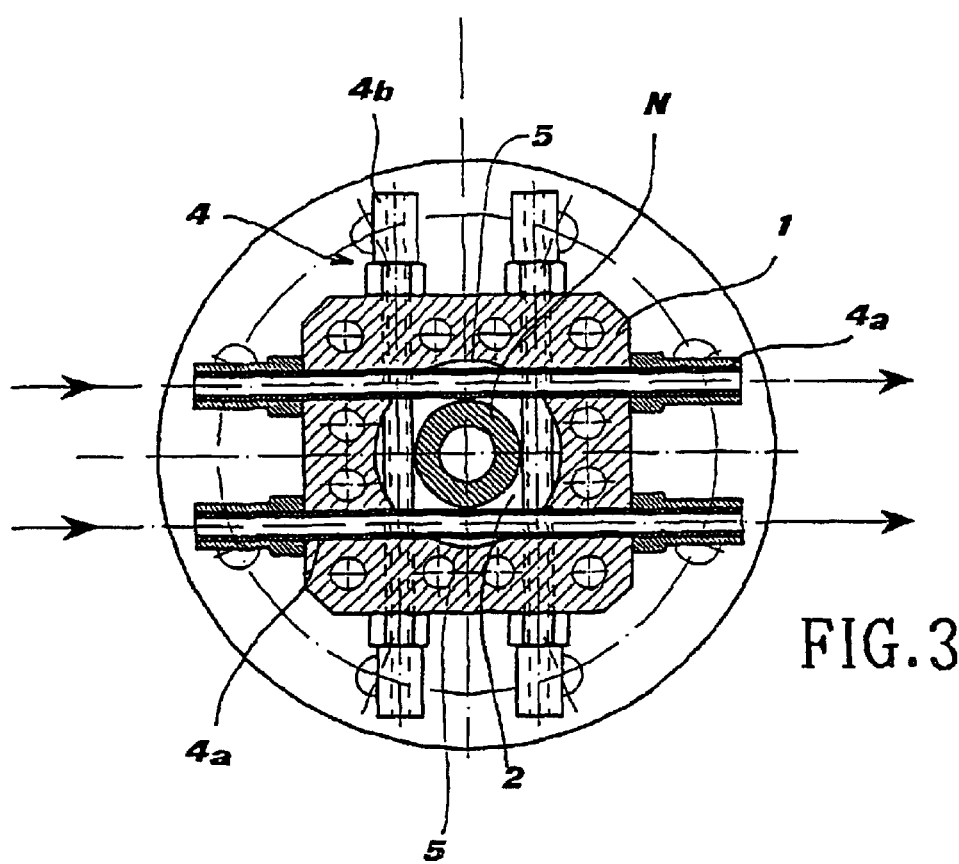
FIG. 3 is a cross-sectional view along the line III-II in FIG. 2.

As shown schematically in FIG. 3, the fluid is circulated by introducing it at one end of the hollow rod 4a and allowing it flow out at the opposite end by means of suitable delivery and return pipes (not shown).

Further, as can be well appreciated from FIG. 3, between the rods 4a and the internal surface of the cylinder wall a substantial clearance 5 is left. In other words, at least a portion of said rods is wholly wetted by the extrusion material. This allows the extrusion material to pass all around the pin members, so as to contact a major portion thereof and enhance the thermal exchange effect. Moreover, the two extrusion material streams, coming from the two sides of the rod 4a during extrusion, meet each other downstream of the rod 4a resulting in an enhanced mixing effect.

The rods according to the invention allow a continuous flow of a heat-regulating fluid, such that it is possible to control in an optimum manner the temperature in accordance with the specific requirements. Moreover, since they are fixed to the extruder body at both ends, even if the portion inside the cylindrical chamber should break, they nevertheless would remain attached to the extruder body without their fragments being able to end up inside the chamber.

This latter characteristic feature is of considerable importance and means that major savings may be made with regard to repair and maintenance costs.

It is understood, however, that the scope of protection of the invention described above is not limited to the particular embodiment shown, but that it is extended to any other constructional modification which achieves the same usefulness.

For example, although mixing pin members with a circular cross-section have been described, it is also possible to use, in particular circumstances, tubular rods with a differently profiled cross-section.

What is claimed is:

1. Extruder of the type comprising an extruder body with a cylindrical chamber inside which an extrusion screw is rotatably inserted, a plurality of mixing thermally regulated pin members being inserted through ceasing of said cylindrical chamber and being fixed with their respective ends to the wall of said extruder, characterized in that at least a portion of said rods projects inside said cylindrical chamber in such a way that its entire circumferential surface may be wetted by the extrusion material so as to enhance heat exchange and mixing effect.

2. Extruder according to claim 1, in which said pin members comprise an hollow rod and a heat-regulating fluid is circulated inside them.

3. Extruder according to claim 2, in which said rods consist of a tubular rod, the ends of which emerge externally from said extruder body and are fixed thereon by means of fixing bushes.

4. Extruder according to claim 3, in which said pin members are provided in pairs, one on one side and one on the opposite side of the extrusion screw.

5. Extruder according to claim 4, in which said pairs of pin members are arranged longitudinally, alternating at 90° with respect to each other.

6. Extruder according to claim 2, in which said pin members are provided in pairs, one on one side and one on the opposite side of the extrusion screw.

7. Extruder according to claim 6, in which said pairs of pin members are arranged longitudinally, alternating at 90° with respect to each other.

8. Extruder according to claim 1, in which said pin members are provided in pairs, one on one side and one on the opposite side of the extrusion screw.

9. Extruder according to claim 8, in which said pairs of pin members are arranged longitudinally, alternating at 90° with respect to each other.

\* \* \* \* \*